United States Patent
Welch et al.

(10) Patent No.: US 12,485,791 B2
(45) Date of Patent: Dec. 2, 2025

(54) ENDURANCE MODE FOR ELECTRIC VEHICLE

(71) Applicant: GM GLOBAL TECHNOLOGY OPERATIONS LLC, Detroit, MI (US)

(72) Inventors: Sean M. Welch, Bruce Township, MI (US); Sami Ahmed, Orion Township, MI (US); Michael G. Petrucci, Howell, MI (US); Michael A. Ryba, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 18/172,427

(22) Filed: Feb. 22, 2023

(65) Prior Publication Data
US 2024/0278683 A1    Aug. 22, 2024

(51) Int. Cl.
*B60L 58/12* (2019.01)
*B60L 15/20* (2006.01)

(52) U.S. Cl.
CPC .............. *B60L 58/12* (2019.02); *B60L 15/20* (2013.01); *B60L 2240/16* (2013.01); *B60L 2240/18* (2013.01); *B60L 2240/425* (2013.01); *B60L 2250/26* (2013.01); *B60L 2250/28* (2013.01); *B60L 2260/20* (2013.01)

(58) Field of Classification Search
CPC ...... B60L 58/12; B60L 15/20; B60L 2240/16; B60L 2240/18; B60L 2240/425; B60L 2250/26; B60L 2250/28; B60L 2260/20
See application file for complete search history.

(56) References Cited

U.S. PATENT DOCUMENTS

| | | | |
|---|---|---|---|
| 2016/0363456 A1 | 12/2016 | Pujos et al. | |
| 2017/0327120 A1* | 11/2017 | Oh | B60W 50/082 |
| 2018/0111504 A1* | 4/2018 | Matsusue | B60L 58/33 |
| 2019/0249639 A1* | 8/2019 | Miller | B60H 1/004 |
| 2019/0389452 A1* | 12/2019 | Duan | B60W 10/30 |
| 2021/0086769 A1* | 3/2021 | Vandenbussche | B60W 10/04 |
| 2021/0094420 A1* | 4/2021 | Sosnowski | E02F 9/207 |
| 2021/0394580 A1* | 12/2021 | Chopard | G08G 1/143 |
| 2022/0314995 A1* | 10/2022 | Lerner | B60W 30/18018 |
| 2023/0150394 A1* | 5/2023 | Diamond | B60L 58/14 701/22 |
| 2023/0174103 A1* | 6/2023 | Patel | B60W 60/0027 701/23 |
| 2024/0034335 A1* | 2/2024 | Araki | B60W 50/14 |

FOREIGN PATENT DOCUMENTS

| | | |
|---|---|---|
| DE | 102017102054 A1 | 8/2018 |
| DE | 102020103342 A1 | 8/2020 |
| DE | 102020004796 | 11/2020 |

* cited by examiner

*Primary Examiner* — Helal A Algahaim
*Assistant Examiner* — Karen Lynelle Furgason
(74) *Attorney, Agent, or Firm* — Quinn IP Law (57) ABSTRACT

A system for mode selective control of an electric vehicle during a race. The system may include a demand controller configured for determining a demand made by a driver during the race to control a propulsion system to propel the vehicle, a battery controller configured for determining a supply of electrical power available from a rechargeable energy storage system (RESS) to meet the demand, a temperature controller configured for determining temperature thresholds for the RESS and the propulsion system, and a supply controller configured for controlling use of the supply according to an endurance mode and a qualify mode.

18 Claims, 3 Drawing Sheets

ENDURANCE MODE FOR ELECTRIC VEHICLE

INTRODUCTION

The present disclosure relates to controlling an electric vehicle according to selectable drive modes, such as but not necessarily limited to controlling the electric vehicle according to an endurance mode when racing.

An electric vehicle may be considered as a class of vehicle reliant on an electrical power source to power a propulsion system used for driving the vehicle. When racing, such as when racing around a racetrack to achieve the fastest time or to complete a certain number of laps before other competitors, a driver may desire the vehicle to operate beyond normal or typical operating ranges and/or to otherwise place enhanced demands on the electrical power source. When the electrical power source is unable to meet the demand during a race, the performance of the propulsion system may decline, resulting in slower speeds, and in some situations, preventing the vehicle from finishing a race. While generators, regenerative braking, solar, fuel cells, and other means may be included to resupply the electrical power source, the electrical power source may nonetheless be unable to keep up such that performance during the race may become inconsistent.

SUMMARY

One non-limiting aspect of the present disclosure relates to a system for limiting electric vehicle performance inconsistencies during a race or other circumstance when consistent, high performance output may be desired. The system may be configured to enable a driver to engage a track mode whereby a supply of electric power may be controlled according to a plurality of sub-modes, such as an endurance mode and a qualify mode. The endurance mode may be used to detune, restrain, or otherwise limit an amount of the supply made available for driving the vehicle, which may in turn limit an upper range of performance in exchange for more electrical power consistency. The qualify mode may be used to make a maximum available amount of the supply available for driving the electric vehicle, which may in turn allow the upper range of performance to be reached in exchange for more electrical power inconsistency. A mode controller may be used to enable the driver to selectively switch between the endurance and qualify modes, such as by using the endurance mode throughout most of a race when consistent performance is desired and using the qualify mode when demanding greater power to temporarily boost performance.

One non-limiting aspect of the present disclosure relates to a system for providing an endurance mode for an electric vehicle. The system may include a demand controller configured for determining a demand made by a driver to provide electrical power from a battery of the vehicle to an electric motor configured to propel the vehicle, a mode selector operable between at least an endurance mode and a qualify mode depending on a mode input received from the driver, and a battery controller configured for determining a supply of electrical power available from the battery to meet the demand. The system may further include a supply controller configured for controlling use of the supply according to the mode input. The qualify mode may permit a maximum amount of the supply to be available for use in meeting the demand, and the endurance mode may permit a limited amount of the supply to be available for use in meeting the demand, with the limited amount being less than the maximum amount.

The supply controller may be configured for determining the limited amount based at least in part on an expected heat generation predicted for the vehicle during a race.

The supply controller may be configured for predicting the expected heat generation for a plurality of vehicle systems, the vehicle systems including the motor and determining the limited amount to avoid the expected heat generation surpassing temperature thresholds associated with the vehicle systems.

The supply controller may be configured for determining the limited amount to provide consistent power levels to the motor throughout the race.

The supply controller may be configured for predicting the expected heat generation based on a plurality of heat generation functions and a plurality of heat rejection functions.

The heat generation functions may include functions for predicting the expected heat generation based at least on a duration of the race, a layout of a racetrack, a skill level of the driver, and a state of charge (SOC) of the battery.

The heat rejection functions may include functions for predicting the expected heat rejection based at least on ambient environmental conditions, a coolant temperature and a coolant flowrate for a motor coolant system of the vehicle, a cockpit temperature commanded from a heating, ventilation, and air condition system (HVAC) of the vehicle, and a heat rejection from external airflow.

The supply controller may be configured for predicting the expected heat generation before the race and periodically thereafter at one or more intervals during the race.

The supply controller may be configured for determining an initial value for the limited amount based on the expected heat generation predicted before the race, and replacing the initial value with an updated value determined at each of the intervals, each updated value representing the limited amount based on the expected heat generation predicted thereafter.

The initial value may set an initial power level for maintaining consistent performance throughout a duration of the race, and each update value may set an updated power level for maintaining consistent performance throughout a remainder of the race.

The supply controller may be configured for determining at least one of the intervals in response to the driver switching the mode input during the race from the endurance mode to the qualify mode and thereafter back to the endurance mode.

The maximum amount may be fixed throughout the race.

The minimum amount may be variable throughout the race.

The limited amount may be a percentage of the maximum amount, the percentage being less than 100 percent.

The supply controller may be configured for controlling use of the supply according to the endurance mode unless an accelerated pedal position is at a full displacement position while the mode input is set to the qualify mode. The accelerator pedal position may be configured to represent the demand made by the driver.

One non-limiting aspect of the present disclosure relates to a computer-readable storage medium having a plurality of non-transitory instructions stored thereon, with the non-transitory instructions being executable with a processor to provide an endurance mode for an electric vehicle during a race. The non-transitory instructions may be executable for determining performance parameters expected for the race, the performance parameters including a duration of the race, a layout for a racetrack, and an initial skill level of a driver; determining operating parameters expected for the race, the operating parameters including a state of charge (SOC) of a rechargeable energy storage system (RESS), a RESS temperature threshold for the RESS, an inverter temperature threshold for an inverter configured for powering a motor of a propulsion system, and a drive unit temperature threshold for a drive unit of the propulsion system; determining heat generation parameters expected for the race, the heat generation parameters including a brake pedal value representing expected usage of a brake pedal, an accelerator pedal value representing expected usage of an accelerator pedal, a lateral acceleration value representing expected lateral acceleration, a longitudinal acceleration value representing expected longitudinal acceleration, a steering wheel value representing expected usage of a steering wheel; determining heat rejection parameters expected for the race, the heat rejection parameters including an ambient environmental temperature, a coolant temperature and a coolant flowrate for a motor coolant system, a cockpit temperature commanded from a heating, ventilation, and air condition system (HVAC), and a heat rejection from external airflow; and iterating the performance, operating, heat generation, and heat rejection parameters to generate an endurance power level for an endurance mode, the endurance mode providing consistent performance of the vehicle throughout the race while optimizing performance and operating below the temperature thresholds.

The non-transitory instructions may be operable for: monitoring activities of the driver during the race relative to the skill level; decreasing the power limit when the activities indicate the driver is operating during the race at a higher skill level than the initial skill level; and increasing the power limit when the activities indicate the driver is operating during the race at a lower skill level than the initial skill level.

The non-transitory instructions are operable for: determining a demand made by the driver to propel the vehicle over the racetrack; determining whether the endurance mode and a qualify mode is active; determining a supply of electrical power available from the RESS to meet the demand; and controlling use of the supply to meet the demand according to the endurance power level when the endurance mode is active and according to a qualify power level when the qualify mode is active, the qualify power level being greater than the endurance power level and incapable of providing consistent performance of the vehicle throughout the race.

One non-limiting aspect of the present disclosure relates to a system for controlling an electric vehicle during a race. The system may include a demand controller configured for determining a demand made by a driver during the race to control a propulsion system to propel the vehicle, a battery controller configured for determining a supply of electrical power available from a rechargeable energy storage system (RESS) to meet the demand, and a temperature controller configured for determining temperature thresholds for the RESS and the propulsion system. The system may further include a supply controller configured for controlling use of the supply according to an endurance mode and a qualify mode. The qualify mode may permit a maximum amount of the supply to be available for use in meeting the demand, and the endurance mode may permit a limited amount of the supply to be available for use in meeting the demand. The limited amount may be less than the maximum amount and selected to optimize consistent performance of the vehicle throughout the race while operating below the temperature thresholds.

The temperature controller may be configured for determining the limited amount based at least in part on a skill level of the driver, including setting the limited amount to a novice amount when the skill level is novice and to an expert amount when the skill level is expert, with the expert amount being less than the novice amount.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
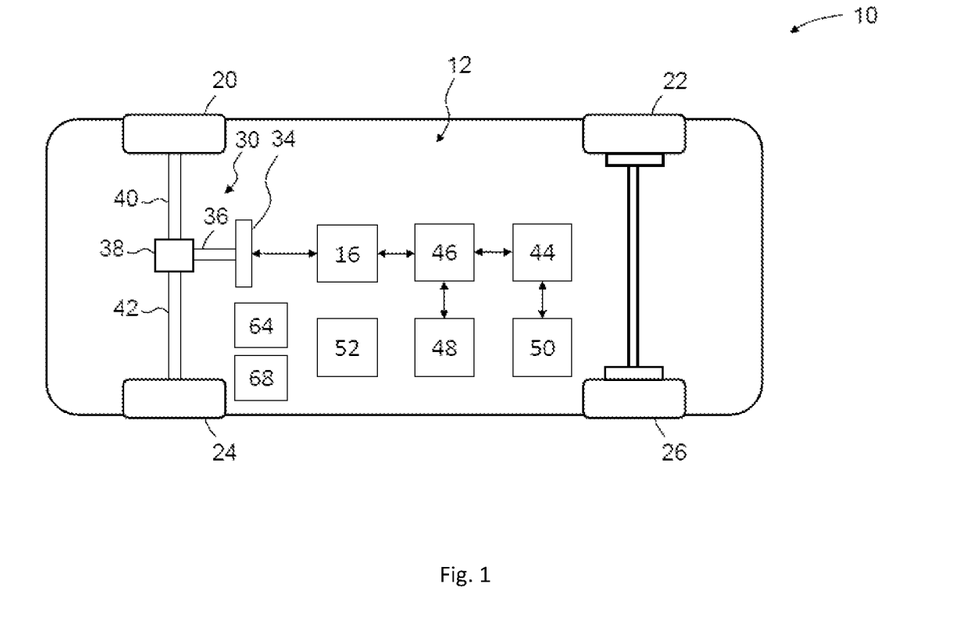
FIG. 1 illustrates a schematic view of a control system in accordance with one non-limiting aspect of the present disclosure.

FIG. 1 illustrates a schematic view of an electric vehicle 10 having a control system 12 in accordance with one non-limiting aspect of the present disclosure. The vehicle 10 is illustrated for exemplary purposes as including an electric motor 16 to provide rotational force/torque (mechanical power) to one or more of a plurality of wheels 20, 22, 24, 26, such as via a propulsion system 30 configured to connect the motor 16 to the front wheels 20, 24. The propulsion system 30 may include a transmission 34, a driveshaft 36, a differential 38, axles 40, 42, and/or other componentry to facilitate conveying rotative force from the motor 16 to the wheels 20, 22, 24, 26. A battery pack, fuel cell, or rechargeable energy storage system (RESS) 44 may be configured to provide a supply of direct current (DC) power to an inverter 46 whereupon the inverter 46 may be configured to supply alternating current (AC) power (electrical power) to the electric motor 16 for conversion to the mechanical power used to drive the propulsion system 30. A motor or mode controller 48 may be configured to generate control signals associated with directing and otherwise implementing the control of the motor 16 contemplated herein.

The vehicle 10 is predominately described as a two-wheel drive automobile for exemplary non-limited purposes as the present disclosure fully contemplates its use and application with four-wheel drive automobiles and other, non-automobile types of vehicles, including other types of electric vehicles, such as hybrid electric vehicles that rely additionally on an internal combustion engine (ICE) for propulsion. In a racing environment, which may be constrained to achieving the fastest lap time and/or completing a certain amount of laps before other competitors, the vehicle 10 may be requested to operate at upper ranges or extreme ends of its capabilities, often for a predefined or limited period of time. In these circumstances, the vehicle 10 may be limited in its ability to resupply or recharge the electrical power source due to a generator (regenerative braking or ICE deriver generator, solar, etc.) 50 being unable to keep up with demand and/or track rules, class requirements, and the like placing limits on using and/or recharging the electric power source 44. The racing environment, as such, creates a set of circumstances where it may be desirable to control the vehicle 10 differently than in non-racing environments, i.e., it may be beneficial to use drive modes differing from typical, roadway drive modes.

One non-limiting aspect of the present disclosure relates to a track mode for controlling the vehicle 10 in a manner intended to limit performance inconsistencies associated with limitations placed on or inherent to recharging or resupply the electrical power source 44 during a race. The track mode may correspond with a drive mode being selectable by a driver for purposes of controlling the electric vehicle during a race. The track mode may enable a driver to selectively switch between an endurance mode and a qualify mode while racing without having to stop or interrupt driving of the vehicle 10. The track mode may be one of a plurality of drive modes available for controlling the vehicle 10. The motor controller 48 or other controller(s) 52 may be configured to facilitate controlling a number of vehicle operating parameters depending on the selected drive mode. The motor controller 48 may include a processor configured for executing a plurality of non-transitory instructions stored on a computer readable storage medium to facilitate implementing the various drive modes.

A drive mode table shown below illustrates a plurality of drive modes available for the vehicle 10 in accordance with one non-limiting aspect of the present disclosure.

|  | Drive Mode | | | | |
| --- | --- | --- | --- | --- | --- |
|  |  |  |  | Track | |
| Vehicle Parameters | Snow/Ice | Tour | Sport | Qualify | Endurance |
| Max Propulsion | <100% | 100% | 100% | 100% | <100% |
| Pedal Map/Transient | Level 2 | Level 1 | Level 3 | Level 2 | Level 2 |
| Cooling System Output | Normal | Normal | Elevated | Max | Max |
| Preconditioning Mode | No | No | No | Yes | Yes |
| Suspension | Tour | Tour | Sport | Track | Track |
| Steering | Sport | Tour | Sport | Track | Track |
| Braking | Tour | Tour | Sport | Track | Track |
| Chassis Controls | Snow/Ice | Tour | Sport | Track | Track |

In addition to the track mode, the available drive modes may include a snow/ice mode, a tour mode, and/or a sport mode, with values for each of a plurality of vehicle operating parameters being set according to the intended influence of the associated drive mode.

A maximum propulsion output parameter may be used to define a power value for specifying a percentage or an amount of the electrical power supply the driver may access or otherwise demand. A pedal map parameter may be used to define a pedal map value for representing a type of pedal map to be used in translating displacement of an accelerator pedal to a demand for electrical power delivery to the traction motor 16. A cooling system output parameter may be used to define a cooling value for representing a type of cooling strategy to be implemented, e.g., a cooling system of the vehicle may be used to cool the electrical power source 50 and/or other components of the vehicle, such as according to a normal, elevated, and/or max setting. The max setting may provide enhanced cooling of the traction motor 16, for example, at the expense of consuming more electrical power (e.g., to driver compressors or fan speed at elevated levels) in exchange for optimizing performance of the traction motor 16. A preconditioning parameter may be used to define a preconditioning value to be used in specifying when schedules, routines, etc., may be implemented, which is shown for exemplary purposes as being a binary value indicating the preconditioning to be either turned on or turned off. A suspension parameter may be used to define a suspension value for representing a type of suspension to be implemented. A steering parameter may be used to define a steering value for representing a type of steering control to be implemented. A braking parameter may be used to define a braking value for representing a type of braking control to be implemented. A chassis control parameter may be used to define a chassis value for representing a type of chassis control to be implemented.

The present disclosure fully contemplates including more or less of the tabled vehicle operating parameters, and merely presents the foregoing as exemplary illustrations of various controllable parameters. While the values need not be so similar, it may be beneficial when racing to maximize or tailor each available operating parameter for racing. Some of the values set for the various vehicle operating parameters associated with the track mode are shown to be identical for both of the qualifying and endurance modes, with the exception of the power values being different for the maximum propulsion output parameter. The consumption of electrical power while racing may be a significant influence on an ability of vehicle 10 to perform consistently throughout a race. As such, one non-limiting aspect of the present disclosure contemplates the endurance mode may be used to detune, restrain, or otherwise limit an amount of the supply made available for driving the vehicle 10, which in turn may limit an upper range of performance in exchange for more electrical power consistency. The qualify mode, in contrast, may be used to make an unlimited amount or a maximum available amount of the supply available for driving the electric vehicle, which in turn may allow the upper range of performance to be reached in exchange for more electrical power inconsistency. The endurance mode, for example, may be used throughout most of a race when consistent performance is desired, with the driver periodically switching to the qualify mode when demanding greater access to the supply, such as to pass a competitor or to temporarily boost performance.

The system 12 may include a main controller 52 to facilitate implementing the drive modes. The controller 52 may, at least for that purpose, operate in cooperation with various sensors, controllers, modules, and other componentry of the vehicle 10, such as a demand controller, a battery controller, a temperature controller, and a supply controller (not shown), which may be part of or operate independently of the controller 52. The controller 52 may be configured to facilitate diagnosing, measuring, or otherwise processing information associated with components included within the vehicle 10, which may be used to set an endurance power level, or limited amount, for the endurance mode, and a qualify power level, or maximum amount, for the qualify mode. The controller 52 may be used in cooperation with and/or independently of the motor controller 48 to facilitate the operations contemplated herein, and may include capabilities for communicating over a vehicle network or otherwise exchanging information with other controllers and componentry within the vehicle 10 to that end. The controller 52, accordingly, may be configured to facilitate selectively implementing the drive modes according to driver input, e.g., command or selection made through an infotainment or telematics unit, and/or remote input, e.g., wireless control signal originating from a handheld device or outside of the vehicle 10.

Figure 2:
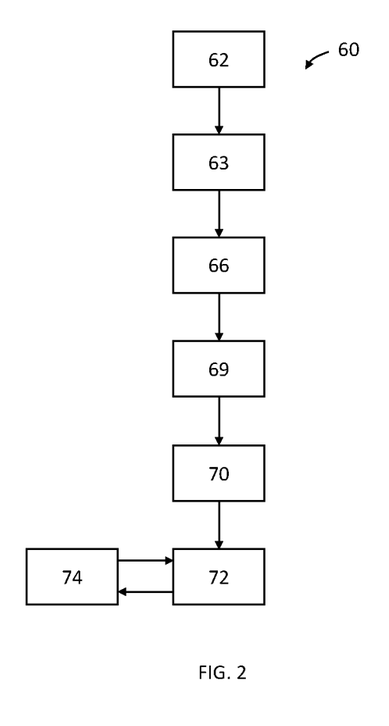
FIG. 2 illustrates a flowchart of a method for configuring an endurance mode in accordance with one non-limiting aspect of the present disclosure.

FIG. 2 illustrates a flowchart of a method 60 for configuring the endurance mode in accordance with one non-limiting aspect of the present disclosure. Block 62 relates to determining performance parameters expected for the race. The performance parameters may include a duration of the race, which may be specified according to distance, number of laps, or period of time, a type of race or racetrack, such as a circuit or an autocross type of race, a layout of the racetrack, a skill level for the driver, such as to identify the driver's skill level as a novice, intermediate, or expert, etc. Block 63 relates to determining operating parameters expected for the race. The operating parameters may include a state of charge (SOC) of a rechargeable energy storage system (RESS), a RESS temperature threshold for the RESS, an inverter temperature threshold for an inverter configured for powering a motor of a propulsion system, and a drive unit temperature threshold for a drive unit of the propulsion system.

Block 66 relates to determining heat generation parameters expected for the race. The heat generation parameters may include a brake pedal value representing expected usage of a brake pedal, an accelerator pedal value representing expected usage of an accelerator pedal, a lateral acceleration value representing expected lateral acceleration, a longitudinal acceleration value representing expected longitudinal acceleration, a steering wheel value representing expected usage of a steering wheel. Block 69 relates to determining heat rejection parameters expected for the race. The heat rejection parameters may include an ambient environmental temperature, a coolant temperature and a coolant flowrate for a motor coolant system, a cockpit temperature commanded from a heating, ventilation, and air condition system (HVAC), and a heat rejection from external airflow. Block 70 relates an iterating process for iterating the performance, operating, heat generation, and heat rejection parameters to generate an endurance power level or the limited amount of the supply to be made available during the race when operating according to the endurance mode. The endurance power level may be calculated for providing consistent performance of the vehicle throughout the race while optimizing performance and operating below the temperature thresholds.

Block 72 relates a calibration process for generating a propulsion calibration profile or other profile sufficient for defining controls, limits, and other requirements placed upon operation of the vehicle to facilitate operating within the metes and bounds of the endurance mode, which may include setting discharge and charge limits for the RESS. Block 74 relates to a feedback process for recalibrating and/or updating the values determined during a preceding iteration, such as to replace initial values with update values at selectable intervals during the race. One such interval may correspond with switching from the endurance mode to the qualify mode and back to the endurance mode whereafter it may be desired to update the endurance mode to account for activities undertaken while in the qualify mode. The foregoing is described for non-limiting purposes as the present disclosure fully contemplates utilizing other parameters, activities, metrics, etc. to facilitate assessing various vehicle systems and selecting limitations needed when operating according to the endurance mode to provide consistent performance of the vehicle throughout the race while optimizing performance and operating below the temperature thresholds.

Figure 3:
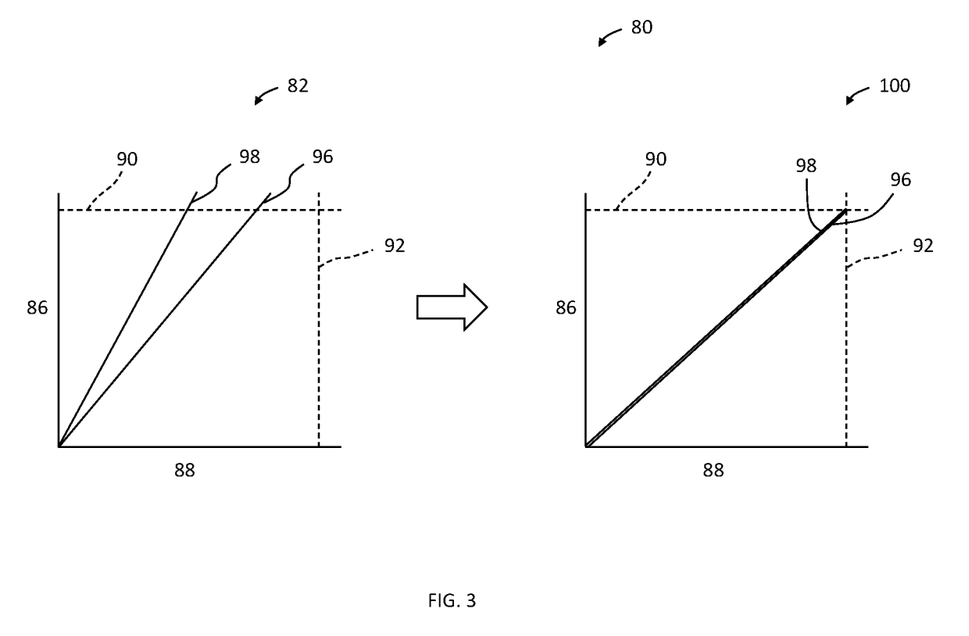
FIG. 3 illustrates a schematic diagram of an iterating process in accordance with one non-limiting aspect of the present disclosure.

FIG. 3 illustrates a schematic diagram 80 of the iterating process in accordance with one non-limiting aspect of the present disclosure. The iterating process may include generating expectations for the race according to the above-described parameters, such as to predict corresponding values expected for the race based on the skill level of the driver. An unlimited graph 82 is shown as having a vertical access 86 representing temperature and a horizontal access 88 representing time. A temperature limit may be included to identify a temperature threshold 90 above which performance of the vehicle 10 may be restricted. The temperature threshold 90 may be defined relative to the above described thresholds, and/or other non-temperature thresholds for the vehicle systems may be similarly used. A race duration may be included to identify a time threshold 92 for the race based on an expected number of laps or race time. A novice line 96 and an expert line 98 are shown in the unlimited graph 82 to represent expected increases in temperature for the vehicle 10 during the course of the race. The novice line 96 is shown to have a lower slope than the expert line 98 due to an expectation of the expert driver being able to drive the vehicle 10 more assertively, and as a consequence, at higher temperatures than the novice driver. The unlimited graph 82 illustrates a probability of both the expert and the novice drivers exceeding the temperature threshold 90 before completion of the race. A limited graph 100 is shown to represent adjustments made as part of the iterative process to limited power or duty cycle accessible to the novice and expert drivers until the novice and expert lines 96, 98 are determined to provide slopes predicted to be sufficient for completing the race before surpassing the temperature threshold.

Figure 4:
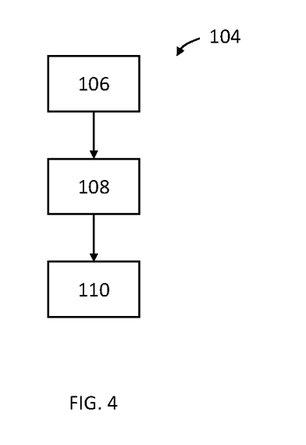
FIG. 4 illustrates a flowchart of a method for providing endurance mode control in accordance with one non-limiting aspect of the present disclosure.

FIG. 4 illustrates a flowchart 104 of a method for providing endurance mode control for a vehicle during a race. Block 106 relates to the controller 52 determining a demand for providing electrical power to the traction motor 16, such as in response to a corresponding input from the driver or another system or the vehicle 10, e.g., an autonomous control system may be configured to autonomously race the vehicle and/or the vehicle 10 may be raced through remote control. With respect to vehicle 10 being driven with an in-vehicle driver, the demand may be determined as a function of a displacement of an accelerator pedal 64. The vehicle 10 may include the accelerator pedal 64, as one skilled in the art will appreciate, to facilitate communicating driver commands power, speed, acceleration, etc. to the motor controller 48 for implementation. The controller 52 may monitor the displacement, optionally with a displacement sensor, and/or receive a corresponding feedback from the motor controller 48. The displacement may correspond with the driver adjusting the pedal 64 depending on the amount of electrical power being demanded.

The displacement may correspond with a pedal map or other conversion whereby the amount of displacement may equate to requesting a corresponding quantity of electrical power. The accelerator pedal 64, for example, may be operable between a plurality of pedal positions depending on a pedal input received from the driver, i.e., depending on how hard and/or far the driver displaces the pedal 64. When at rest or when otherwise not being pressed by the driver, the pedal 64 may default to a zero or non-displaced position whereafter it may be displaced by the driver up to a full or complete displacement displace position where the accelerator pedal is pressed all the way down, i.e., full throttle. The pedal 64 may be controllable between a number of additional, incremental pedal positions between the non-displaced and fully displaced positions, which may be characterized as partial displacement positions. The pedal input, of course, in the case of the vehicle 10 being controlled through other mechanisms, may be replaced with another type of input sufficient for representing a demand to consume the supply of available electrical power.

Block 108 relates to the controller 52 determining an active or previously selected one of the drive modes to be used in meeting the demand. One non-limiting aspect of the present disclosure contemplates the controller 52 being operable to switch between each of the drive modes while the vehicle 10 is in motion, and optionally while the driver is actively displacing the accelerator pedal 64. Particularly when racing, however, it may be beneficial to prevent or disable use of the non-track modes, i.e., the snow/ice, tour, and sport modes, as those modes may be less amenable to optimizing track performance in the manner contemplated herein. The present disclosure fully contemplates each of the modes being available, and optionally providing the driver a capability to pre-select or otherwise use one of the modes throughout driving, i.e., to enable full-time use of the qualify mode. Block 108 may include the controller 52 assessing a mode selector 68 to be in one of an endurance state and a qualify state. The mode selector 68 may correspond with a paddle or other button or actuatable feature included on a steering wheel, such as one that may be pushed or pulled with pressure applied by the driver, and/or button or other interface included within an infotainment system through which driver commands may be received. When used while racing, one non-limiting aspect of the present disclosure contemplates it being beneficial for the driver to maintain contact with the steering wheel at all times such that the mode selector 68 may correspond with the driver pushing, pulling, or avoiding contact with the paddle. Block 66 may additionally include the controller 52 assessing a pedal position or displacement of the pedal 64, such as by determining whether the accelerator pedal is in a fully displaced position or a partially displaced position.

Block 110 relates to the controller 52 regulating the supply of electrical power provided to meet the demand according to the active one of the quality and endurance modes, i.e., the mode active at the time of receiving the demand in Block 106. The controller 52 may be configured to regulate the supply of electrical power by providing corresponding instructions to the electric power source 44, the inverter 46, and/or the motor controller 48. One non-limiting aspect of the present disclosure contemplates optimizing performance of the vehicle 10 while racing by configuring the endurance and qualify modes to include essentially identical values for each of the vehicle operating parameters, with the exception of the power values set for the maximum propulsion output parameter differing. The power values may be used for representing an amount or a percentage of electrical power the driver is permitted to request from the electrical power source 44 at a particular point in time, i.e., the portion of the supply of electrical power the driver may be entitled to access at the time of receiving the demand.

The true or actual supply of electrical power available from the electric power source 44 may vary throughout a race depending on a state of charge (SOC), temperature, lifecycle, and other influences on the electrical power source 44. The power value specified for the maximum propulsion output parameter may correspond with a percentage, a duty cycle, or other portion of the true or actual amount of the supply the driver can use to meet the demand. Returning to the above Table, the power values are shown to be defined on a relative scale, with the power value for the qualify mode being set to 100 percent (100%) and the power value for the endurance mode being set less than 100 percent (<100%), e.g., 40%, 50%, 75%, etc. The endurance mode may be configured in this manner to provide the driver access to a limited amount of the power supply versus the quality mode providing access to a maximum available amount of the power supply. The power limitations imparted with the endurance mode may provide more performance consistency throughout the race in a manner intended to avoid surpassing vehicle system temperature thresholds.

One non-limiting aspect of the present disclosure contemplates the qualify mode being beneficial in temporarily boosting performance by permitting the driver access to 100% of the available supply of electrical power, whereas the endurance mode may be beneficial in enabling the driver to maintain consistency throughout the race by conserving use of the electrical energy supply, which can be helpful in preventing the driver from draining the electrical power supply before the end of the race. The percentage decrease or de-tuning associated with the endurance mode may be a design parameter selected as part of the calibration process, e.g., 75% may be selected for a race having a certain duration and 50% may be selected for a longer race, i.e., the consistency increases as the power value decreases. The power value may be selected in this manner prior to a race based on strategy, ambient temperature, and/or other factors. The endurance mode, as such, may be the desired mode for a majority of the race in order to ensure completion, with the qualify mode being an optional feature the driver can engage when needing a boost in performance.

With a preference for the endurance mode to be predominantly used throughout the race, it may be beneficial to meet the demand determined in Block 106 according to the operating parameters of the endurance mode, i.e., using a limited amount of the available electrical power, unless circumstances warrant using a maximum available amount. Accordingly, one non-limiting aspect of the present disclosure contemplates relying on the endurance mode to meet the demand unless the pedal 64 is fully displaced, i.e., unless a displacement of the pedal 64 is at a maximum. While permitting use of the qualify mode when the pedal is less than fully displaced is contemplated, limiting the qualify mode to full displacement scenarios may be used to ensure access to the maximum available amount of electrical power is limited to situations where the limited amount is insufficient, which may occur while the driver is fully depressing the pedal 64 and still requires a boost in performance.

In the event that the demand determined in Block 106 coincides with the driver fully displacing the pedal 64, Block 110 may include assessing whether the endurance state or the qualify state was determined to be active in Block 108. The main controller 52, for example, may be operable according to a temporary schedule whereby the qualify state may be determined as long as the driver is contemporaneously pushing or pulling on the mode selector 68, with the endurance state being defaulted to when the driver is not pushing or pulling the mode selector 68. The main controller 52, alternatively, may be operable according to a persistent schedule whereby the qualify state determined in response to determining a first occurrence of the driver pushing or pulling the mode selector 68 and thereafter until determining a second occurrence of the driver pushing or pulling the mode selector 68, whereafter the endurance state may be determined until a third occurrence of the pushing or pulling the mode selector 68, i.e., until the driver attempts to select the qualify state again. In this manner, when the pedal 64 is fully displaced, Block 110 may relate to meeting the demand according to the endurance mode when the endurance state is active and according to the qualify mode when the qualify state is active.

As supported above, the present disclosure may provide capabilities to enable consistent performance in an electric vehicle for the driver's desired duration with robustness and power reduction due to voltage/current limitation or hardware temperature limitation. A propulsion system management may be implemented through a complex model that takes several external influences into account to optimize the vehicle performance for the driver's intended duration when consistent optimized performance is desired. The performance may be optimized based on the intended usage (circuit or autocross) and duty cycle from a specific venue is also a novelty. While the track session duration may be one of the determining factors in establishing the algorithm charge and discharge limits, these limits may also be influenced by the duty cycle of a specific track venue. The energy consumption, heat generation, and heat rejection capability may vary between smaller and larger track venues such that adding an additional layer to managing the propulsion system output based on track venue assures that the vehicle performance is optimized for its intended usage. Additionally, when the driver selects the desired usage (circuit or autocross), desired duration and track venue, the optimized RESS charge and discharge limits may be established such that the vehicle may enter a state where the RESS may be preconditioned to the optimum temperature. A skill level scaler may be also utilized as an input when determining the propulsion system output, such as by predicting heat generation based on the driver's inputs, which may enable the vehicle performance to adapt as the driver's skill level changes.

One non-limiting aspect of the present disclosure provides an endurance mode operable for controlling an electric vehicle to provide consistent vehicle performance when desired by the driver via a predetermined propulsion system output limit (e.g., continuous laps on a racetrack). The predetermined propulsion system output limit may be determined through an endurance mode model that takes input from vehicle sensors as well as driver inputs through a human-machine-interface (HMI), such inputs may include RESS SOC, RESS temperature, inverter temperature, drive unit temperature, track venue, desired session duration and driver skill level. Once this information is entered, the model may estimate the heat generation and iterate down to the optimum propulsion system charge (regen) and discharge limits to maximize performance for the intended duration to ensure the vehicle stays within the various temperature and voltage/current limits. Using RESS, inverter, drive unit, and/or other temperature thresholds and value, the vehicle performance may be limited by the max RESS, inverter, or drive unit temperature limits, optionally with each of these temperature limits being predicted in order to iterate down to a power level that keeps the RESS, inverter, and drive unit temperatures from exceeding their limit within the track session parameters determined by the driver. Each of these temperatures may be predicted by modeling the heat generated within the RESS, inverter, or drive unit and the heat rejected to the cooling medium and characterized through an algorithm or look-up table. The endurance mode may incorporate several factors that impact the rate of temperature rise within the RESS, inverter or drive unit, including coolant temp, coolant flow rate, rolling average of current discharge, rolling average of current charge (regen), track session duration, front end air flow rate, HVAC setting and ambient temperature among others. The performance may be limited by the RESS state of charge, therefore it may be predicted in order to iterate down to a power level that keeps the RESS from exceeding voltage or current limits associated with a lower state of charge. A lap distance may be used to impact the maximum amount of power that can be extracted consistently in a similar manner as the duty cycle. As the power level increases the amount of energy consumed may also increase such that a minimum SOC may impact performance as the voltage limits are approached such that the total energy consumption may be predicted to avoid exceeding the minimum SOC threshold where performance will be impacted. The lap distance may be either be entered by the driver through the HMI display or a known track can automatically be detected by GPS. The driver skill level may be a parameter considered to impact the heat generation since a highly skilled driver may extract more performance out of the car than a driver with a lower skill level. The predicted heat generation may determine the propulsion system output considering the driver skill level based on several driver input variables. The vehicle may be able to start with initialized estimates based on the saved driver settings or start with a default "A" level driver which assumes a higher skill level and greater rate of heat generation and therefore would be the most conservative starting point. The vehicle may be able to adapt the propulsion system output as external variables and driver skill level changes over time. The propulsion system may determine charge and discharge limits may be based on the lowest value from iteration of each of the input variables mentioned previously.

While the foregoing is predominantly described with respect to racing an electric vehicle, the present disclosure fully contemplates its use and application in other environments and/or with other types of vehicles, such as to facilitate consistent operations for temporary high load applications, such as backup power supply for electrical grid high demand periods, sustained high load applications, such as trucking or railway applications, variable load applications, such as vehicles with configurable tow/haul modes, temporary high loads on home based backup supply, e.g. V2X and V2G, high loads in other transportation applications, such as highway snow plowing or road work, power management in off road applications including farm or utility, and/or power management for other transportation applications (e.g. aircraft, watercraft, etc.).

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for providing an endurance mode for an electric vehicle, comprising:
    a demand controller configured for determining a demand made by a driver to provide electrical power from a battery of the vehicle to an electric motor configured to propel the vehicle;
    a mode selector operable between at least an endurance mode and a qualify mode depending on a mode input received from the driver;
    a battery controller configured for determining a supply of electrical power available from the battery to meet the demand; and
    a supply controller configured for controlling use of the supply according to the mode input, the qualify mode permitting a maximum amount of the supply to be available for use in meeting the demand, the endurance mode permitting a limited amount of the supply to be available for use in meeting the demand, the limited amount being less than the maximum amount; and the supply controller is additionally configured for controlling use of the supply according to the endurance mode unless an accelerator pedal position is at a full displacement position while the mode input is set to the qualify mode, the accelerator pedal position configured to represent the demand made by the driver.

2. The system according to claim 1, wherein:
the supply controller is configured for determining the limited amount based at least in part on an expected heat generation predicted for the vehicle during a race.

3. The system according to claim 2, wherein:
the supply controller is configured for:
predicting the expected heat generation for a plurality of vehicle systems, the vehicle systems including the motor; and
determining the limited amount to avoid the expected heat generation surpassing temperature thresholds associated with the vehicle systems.

4. The system according to claim 3, wherein:
wherein the supply controller is configured for determining the limited amount to provide consistent power levels to the motor throughout the race.

5. The system according to claim 4, wherein:
the supply controller is configured for predicting the expected heat generation based on a plurality of heat generation functions and a plurality of heat rejection functions.

6. The system according to claim 5, wherein:
the heat generation functions include functions for predicting the expected heat generation based at least on a duration of the race, a layout of a racetrack, a skill level of the driver, and a state of charge (SOC) of the battery.

7. The system according to claim 6, wherein:
the heat rejection functions include functions for predicting the expected heat generation based at least on ambient environmental conditions, a coolant temperature and a coolant flowrate for a motor coolant system of the vehicle, a cockpit temperature commanded from a heating, ventilation, and air condition system (HVAC) of the vehicle, and a heat rejection from external airflow.

8. The system according to claim 3, wherein:
the supply controller is configured for predicting the expected heat generation before the race and periodically thereafter at one or more selectable intervals during the race.

9. The system according to claim 8, wherein:
the supply controller is configured for:
    determining an initial value for the limited amount based on the expected heat generation predicted before the race; and
    replacing the initial value with an updated value determined at each of the intervals, each updated value representing the limited amount based on the expected heat generation predicted thereafter.

10. The system according to claim 9, wherein:
the initial value sets an initial power level for maintaining consistent performance throughout a duration of the race; and
each update value sets an updated power level for maintaining consistent performance throughout a remainder of the race.

11. The system according to claim 9, wherein:
the supply controller is configured for determining at least one of the intervals in response to the driver switching the mode input during the race from the endurance mode to the qualify mode and thereafter back to the endurance mode.

12. The system according to claim 8,
wherein: the maximum amount of the supply is fixed throughout the race.

13. The system according to claim 12, wherein:
minimum amount of the supply is variable throughout the race.

14. The system according to claim 13, wherein:
the limited amount is a percentage of the maximum amount, the percentage being less than 100 percent.

15. A computer-readable storage medium having a plurality of non-transitory instructions stored thereon, the non-transitory instructions executable with a processor to provide an endurance mode for an electric vehicle during a race, the non-transitory instructions executable for:
  determining performance parameters expected for the race, the performance parameters including a duration of the race, a layout for a racetrack, and an initial skill level of a driver;
  determining operating parameters expected for the race, the operating parameters including a state of charge (SOC) of a rechargeable energy storage system (RESS), a RESS temperature threshold for the RESS, an inverter temperature threshold for an inverter configured for powering a motor of a propulsion system, and a drive unit temperature threshold for a drive unit of the propulsion system;
  determining heat generation parameters expected for the race, the heat generation parameters including a brake pedal value representing expected usage of a brake pedal, an accelerator pedal value representing expected usage of an accelerator pedal, a lateral acceleration value representing expected lateral acceleration, a longitudinal acceleration value representing expected longitudinal acceleration, a steering wheel value representing expected usage of a steering wheel;
  determining heat rejection parameters expected for the race, the heat rejection parameters including an ambient environmental temperature, a coolant temperature and a coolant flowrate for a motor coolant system, a cockpit temperature commanded from a heating, ventilation, and air condition system (HVAC), and a heat rejection from external airflow; and
  iterating the performance, operating, heat generation, and heat rejection parameters relative to the RESS, inverter, and drive unit temperature thresholds to generate an endurance power level for an endurance mode, the endurance mode optimizing consistent performance of the vehicle throughout the race; and
the non-transitory instructions are operable for:
  monitoring activities of the driver during the race relative to the skill level;
  decreasing the power limit when the activities indicate the driver is operating during the race at a higher skill level than the initial skill level; and
  increasing the power limit when the activities indicate the driver is operating during the race at a lower skill level than the initial skill level.

16. The computer-readable storage medium according to claim 15, wherein:
the non-transitory instructions are operable for:
  determining a demand made by the driver to propel the vehicle over the racetrack;
  determining whether the endurance mode and or a qualify mode is active;
  determining a supply of electrical power available from the RESS to meet the demand; and
  controlling use of the supply to meet the demand according to the endurance power level when the endurance mode is active and according to a qualify power level when the qualify mode is active, the qualify power level being greater than the endurance power level and incapable of providing consistent performance of the vehicle throughout the race.

17. A system for controlling an electric vehicle during a race, comprising:
  a demand controller configured for determining a demand made by a driver during the race to control a propulsion system to propel the vehicle;
  a battery controller configured for determining a supply of electrical power available from a rechargeable energy storage system (RESS) to meet the demand;
  a temperature controller configured for determining temperature thresholds for the RESS and the propulsion system; and
  a supply controller configured for controlling use of the supply according to an endurance mode and a qualify mode, the qualify mode permitting a maximum amount of the supply to be available for use in meeting the demand, the endurance mode permitting a limited amount of the supply to be available for use in meeting the demand, the limited amount being less than the maximum amount and selected to optimize consistent performance of the vehicle throughout the race while operating below the temperature thresholds; and the supply controller is additionally configured for controlling use of the supply according to the endurance mode unless an accelerator pedal position is at a full displacement position while the mode input is set to the qualify mode, the accelerator pedal position configured to represent the demand made by the driver.

18. The system according to claim 17, wherein:
the temperature controller is configured for determining the limited amount based at least in part on a skill level of the driver, including setting the limited amount to a novice amount when the skill level is novice and to an expert amount when the skill level is expert, the expert amount being less than the novice amount.

* * * * *